INVENTOR.
CHARLES ROBERT TALMAGE

ATTORNEYS

United States Patent Office 3,495,958
Patented Feb. 17, 1970

3,495,958
HIGH PURITY STEEL BY POWDER METALLURGY
Charles Robert Talmage, New Canaan, Conn. 06840
Original application Mar. 9, 1967, Ser. No. 621,849.
Divided and this application Mar. 6, 1969, Ser. No. 804,929
Int. Cl. C22c 33/02; B22f 3/16
U.S. Cl. 29—182.5    11 Claims

ABSTRACT OF THE DISCLOSURE

High purity steel is produced by powder metallurgy by starting with a mixture of carbon and substantially finely divided high purity iron-base powder containing removable volatilizable constituents. The amount of carbon added is at least sufficient to provide the desired amount of carbon in the steel. A porous compact is formed of the mixture characterized by intercommunicating pores substantially throughout the compact to allow for removal of volatiles. The compact is subjected to a cleansing treatment in a reducing environment by heating the compact at an elevated temperature sufficient to maintain the intercommunicating pores for a time sufficient to obtain a desired degree of weight loss, and then subjecting the cleansed compact to vacuum sintering at an elevated temperature to remove residual volatiles and to densify the compact and form a sintered product in which the pores remaining are substantially non-intercommunicating. Thereafter, the high purity steel can be hot worked to produce a high purity wrought steel composition which together with about 0.1 to 2.5% carbon constitute at least about 99.5% of the total composition, the steel having a homogeneity factor of less than 2 as determined by a microprobe analyzer using the formula $$\sigma_{obs} = \sqrt{\frac{\epsilon(N-\overline{N})^2}{n-1}}$$

Figure 2:
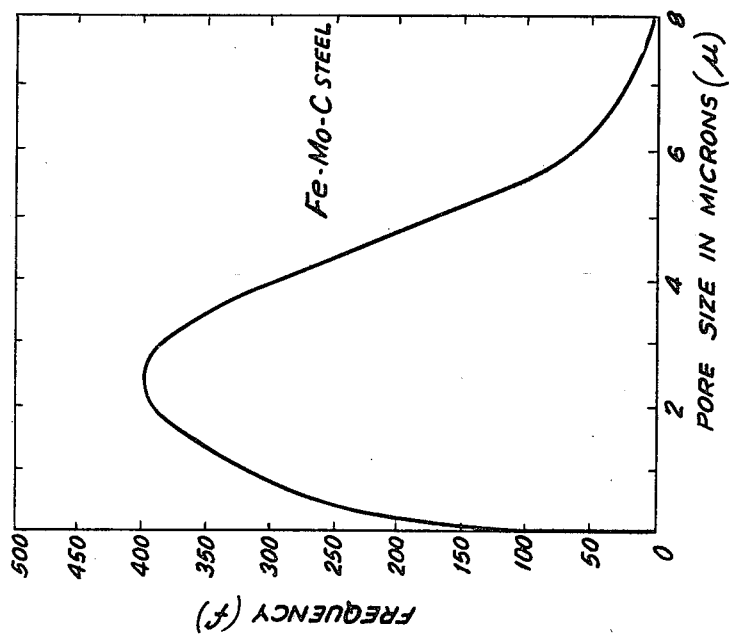

where:

$\sigma_{obs}$ = standard deviation or error observed
$N$ = total number of counts in a time interval
$\overline{N}$ = mean average of many such counts
$n$ = number of individual counts made.

---

This application is a division of application U.S. Ser. No. 621,849, filed Mar. 9, 1967.

This invention relates to high purity metal products produced by powder metallurgy and, in particular, to high purity homogeneous ferrous alloys, such as steels, characterized by an improved combination of chemical, physical and metallurical properties.

Industrial metals and alloys produced by conventional melting, casting and mill working techniques generally exhibit non-uniform metallurgical properties, depending upon their history. This is particularly true of industrial steels. For example, distribution of chemical elements in industrial alloys is not always uniform. Some regions of a particular alloy composition may be enriched in certain elements while other regions may be impoverished in such elements. Such differences in compositions can have a large affect on the subsequent microstructure of industrial steels.

Generally, local deviations from the average composition of an alloy originate from specific conditions in the solidification of the alloy. In the molten state, the alloy normally has a uniform composition until it begins to solidify, during which segregation begins, resulting in the most refractory portions of the solute precipitating first followed by the less refractory portions. This type of segregation leads to a dendritic structure.

Elements which tend to segregate in carbon steel are sulfur, carbon, phosphorous and oxygen (as iron oxide) and, to a lesser degree, manganese and silicon. The segregation of the elements silicon, titanium, aluminum and manganese is relatively small. In alloy steels, the alloying elements chromium and molybdenum tend to segregate particularly as carbides. Billets produced by conventional methods generally show non-homogeneity across its cross section and even lengthwise of the billet.

In addition to segregation, there is the problem of impurities. Industrial metals and alloys generally contain impurities in amounts sufficient to influence some of their metallurgical and physical properties. For example, electrolytically refined copper, while having a purity of about 99.98%, may still contain 13 remaining impurities, the removal of which presents considerable difficulties. Recently, highly refined iron of 99.95 to 99.99% purity has been produced, but such irons are only available in laboratory quantities.

Impurities may occur in the matrix of a metal or alloy either in solution therewith or as mechanically entrained particles or inclusions. Generally, inclusions are non-metallic in nature. In ferrous alloys, such as steels, they may comprise oxides, sulphides and silicates. They may originate as slag, such as occurs when an oxide of one metal reacts with an oxide of another, such as silicon dioxide, to form a silicate. On the other hand, the inclusion may result from the reaction of the molten metal with the refractory furnace lining or refractory linings of containers for molten metal. Or, still further, inclusions may arise through the deoxidation of melt when an additive, such as manganese, silicon, aluminum or zirconium or the like is added to a molten metal bath to combine with oxygen dissolved therein.

In wrought steels, non-metallic inclusions may show up in the form of stringers or coalesced particles. Inclusions are known to have an adverse affect on the fatigue properties of metals in which they are contained. This is particularly true in the case of ball bearing steel. When two contacting surfaces are in relative motion under substantial surface distortion loading, as can occur in ball bearings, inclusions may result in spalling, giving rise to a kind of internal notch effect which results in poor fatigue resistance. For this reason, ball bearing steels should be exceptionally clean.

Small inclusions or other impurities are believed to function as nucleation sites, for example, in martensitic transformation. Since such impurities are seldom, if ever, uniformly distributed throughout the matrix metal, it will be appreciated that the characteristics and uniformity of a microstructure of a particular steel composition may vary in accordance with the metallurgical quality of the steel.

Impurities and inclusions are a particular problem with tool steels; as tool steels contain more alloying agents, it is more difficult to produce high quality alloys using conventional melting practice. The alloy castings usually contain coarse carbide dendrites and segregates which have to be refined and homogenized by means of prolonged heated coupled with deformation working at elevated temperatures. Generally, such complex compositions are sensitive to working and must be handled with great care. Also, the more refractory the segregate, the more difficult it is to homogenize it by prolonged heating which is expensive.

For the purpose of this invention, tool steels are either carbon or alloy steels which are capable of being hardened and tempered. Water-hardening tool steels contain at least 98% iron, while the most highly alloyed steels contain at least 60% iron. Carbon is the most important of the elements for developing high hardness by heat treatment. It usually is present in tool steels in amounts ranging up to about 2%. Most tool steels contain carbon in the range of about 0.5% to 1.5%.

Manganese and silicon are usually found in tool steels in quantities ranging from about 0.15 to 3.0%. As stated hereinbefore, small quantities of these elements are employed in deoxidizing steel in the final stages of melting. Manganese is also effective in combining with sulfur to reduce its deleterious effect on the steel. However, it will be appreciated that such additives result in non-metallic inclusions which may have other adverse effects.

With respect to certain of the alloying elements, the addition of nickel is effective in increasing the toughness and the hardenability of steel. Chromium is used in many tool steels in amounts of 0.2% to 12%. It raises the hardenability of steel and is a strong carbide former. In high carbon tool steels, chromium imparts high wear resistance by virtue of the formation of numerous carbide particles embedded in the matrix of the hardened steel.

Vanadium is also a strong carbide former, however, as little as 0.20% is effective in inhibiting grain growth in heat treated steel. When used in amounts ranging from about 2% to 5%, it exists in the steel as extremely hard particles of vanadium carbide. This element is usually present in the company of chromium and/or molybdenum and/or tungsten.

Tungsten and molybdenum are usually considered the most important of alloying elements in tool steels. The amount of tungsten employed may range from about 0.5% to 20% and molybdenum from about 0.15 to 10%. Both are extremely strong carbide formers and contribute to the red hardness and wear resistance of the resulting heat treated steel.

Cobalt is important as an alloy addition and is commonly employed in the production of certain of the high speed steels. It contributes to improving red hardness.

I provide a method of producing high purity metals and alloys, for example, steels without using conventional melting and casting procedures. Unlike prior conventional methods, I can start with relatively high purity metals and maintain and generally improve the level of purity throughout the processing steps by utilizing a novel combination of operational steps, provided the combination of steps is employed while the materials are substantially in the solid state by utilizing special powder metallurgy techniques. I find that with my method, I can avoid the formation of massive carbide segregates while, at the same time, obtaining a high degree of homogeneity heretofore not possible by conventional and other methods.

It is thus the object of my invention to provide a high purity metal and alloy, such as steel, characterized by an improved combination of chemical, physical and metallurgical properties, including homogeneous metallographic structures.

Another object is to provide by powder metallurgy a high purity steel substantially free from non-metallic inclusions and segregates.

I provide as a further object high purity steel, such as characterized by an improved combination of chemical, physical and metallurgical properties.

A still further object is to provide a high purity sintered steel billet characterized by homogeneity in both the transverse and longitudinal cross section.

Figure 1:
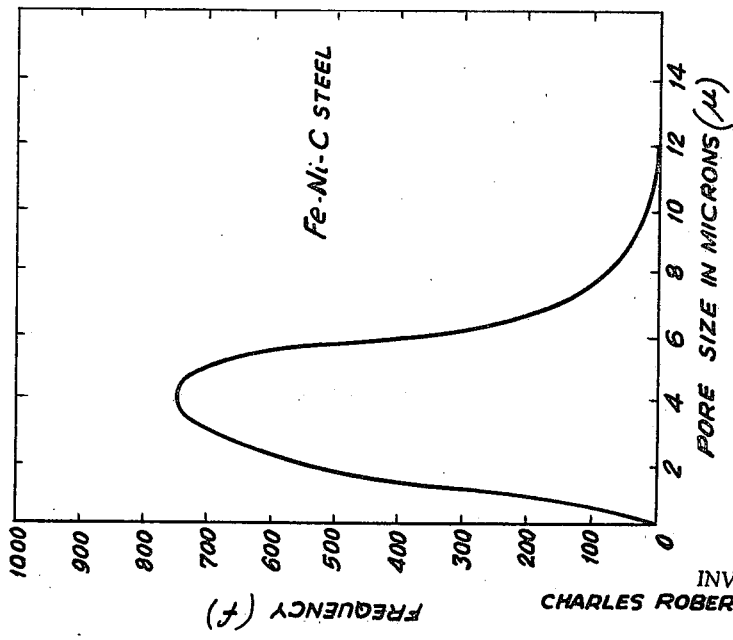

These and other objects will more clearly appear when taken in conjunction with the following description and the accompanying drawing, wherein:

FIGS. 1 and 2 are curves showing the pore size distribution in sintered products produced in accordance with the invention; and FIGS. 3 to 7 are representative of electron probe graphs comparing the relative homogeneity of various sintered and melted compositions.

Stating it broadly, the method employed in producing the metal and alloys of the invention comprises forming a porous metal compact from iron-base metal powder characterized by intercommunicating pores substantially therethrough, subjecting the compact to a cleansing treatment by heating the compact in a reducing environment at an elevated temperature sufficient to obtain optimum weight loss while maintaining intercommunicating pores in the compact, and then subjecting the cleansed compact to a vacuum sintering cycle at an elevated temperature to remove volatiles, to densify said compact and close the interconnecting pores. Thereafter, the sintered compact may be subjected to the usual deformation working processes in producing the desired metal shape.

As will be appreciated, substantially no melting of the metal occurs and little, if any, contamination will occur by reaction with the immediate environment, even during hot working, other than the usual surface effects which result from hot working. Thus, by starting with relatively high purity metal powders, the purity level can be maintained and improved throughout the operation. High purity metal powders are readily available by chemical and electrolytic methods. Generally, the impurities present are those capable of being removed as gases, such as oxygen, hydrogen and nitrogen. These impurities are removed during the special processing provided by the invention. For example, in commercial iron carbonyl powder, oxygen is generally the major impurity present. Removal of oxygen can be accomplished by a thermal cleansing treatment in a reducing environment such as carbon. However, the problem which presents itself is the removal of the contaminant once it has been converted into a gaseous by-product. This removal can be easily accomplished by a vacuum treatment, provided that the compact being treated has maintained its interconnecting pores throughout so that the gaseous products or volatiles can easily escape from the total mass.

It would be preferable to accomplish the deoxidation and the degassing without losing the heat imparted during the deoxidation step, since the contained gas at the elevated temperature will be less dense and, therefore, easier to remove. This can be accomplished by doing both the deoxidation and degassing in the same vacuum chamber or in a pair of interconnecting chambers. By carrying out the deoxidation on a porous compact having a controlled range of porosity in which the pores are intercommunicating, the combination of operational steps set forth hereinbefore offer the following advantages:

(1) Deoxidation can be accomplished because of the high surface area of metal in contact with the reducing environment, such as carbon, dry hydrogen or other reducing agent.

(2) The removal of the gas from the interconnecting pores is fairly rapid under a vacuum.

(3) The metal in the freshly cleansed state is highly sinterable and densifies easily in vacuum as the temperature is raised following degassing.

(4) After the pores have been closed off during high temperature sintering, the compact can be subjected to deformation working without the formation of residual gas pockets in the body of metal.

(5) Fine grain structures are obtainable.

(6) Because of the relative ease with which the steps can be carried out, the method of the invention may be continuous, if desired.

In carrying out the cleansing treatment, it is important that the temperature be sufficiently high to insure removal of the impurities but not so high as to cause pore closure. This can be determined for a particular composition by running weight loss experiments in the presence of a reducing agent, e.g. carbon or hydrogen, over a range of temperatures and over a range of green densities and selecting that temperature in combination with optimum green density which gives the highest weight loss at low shrinkage. As will be appreciated, other things being equal, the higher the cleansing temperature, the greater will be the tendency of the compact to shrink. The rate at which the temperature is raised is an important consideration. The rate should be controlled so as to minimize the temperature gradient between the center of the compact and its outer surface. The temperature should not be brought up so fast and be so high at the surface that the pores in the skin are closed before the gases have a chance of escaping from the porous compact. The shrinkage should be maintained as low as is consistent with maintaining intercommunicating pores throughout the compact and at the surface so that the volatiles can be removed.

The pore-closing sintering is carried out at a much higher temperature and the rate is also important in producing a steel of iron, nickel and carbon. I prefer to start with high purity iron powder, such as carbonyl iron powder, high purity nickel oxide and high purity carbon, or I may start with a high purity iron-base powder, such as iron-nickel alloy powder. The average particle size of the iron or iron-base powder should preferably not exceed 10 microns and the particle size of the alloy addition including carbon should not exceed one micron. The smaller the particle size of the matrix metal, that is iron, the easier it is to complete the diffusion of the alloy ingredient. By iron-base powder is meant powder which is all iron or high purity iron alloy powder containing at least 60% iron.

The fine particle size is also important in producing a fine pore size after sintering, which is desirable for highest strength and for achieving a high degree of subsequent densification. Fine particle size also is important in causing a high degree of densification to occur with a relatively short sintering time and/or temperature. Such short times and lower temperature are desirable to reduce the effects of small pore migration which produce large pores which are not desirable. Large pore sizes are to be avoided as they hinder complete densification during subsequent working.

The use of metal oxide powders as an alloy additive in producing desirable alloy steels is advantageous for several reasons. It is relatively easy to obtain high purity oxides or alloy oxides of very fine particle size which are relatively free of bonded clusters and therefore can be dispersed very well in the iron-base powder. It also normally has a lower density than the pure metal and thus has more bulk for easier and more uniform dispersion. When the oxide is reduced, the particle size becomes smaller as sintering proceeds, which will enhance the diffusion. It is well known that freshly reduced oxide is very reactive and therefore relatively easily diffused and promotes sintering due to the very fine particle size. Such oxides can also prevent or reduce shrinkage effects during the early part of sintering, whereby to prevent the sealing off of fine pores, which otherwise would inhibit the degassing that is necessary for the production of a high purity product.

The use of high purity carbon in the form of carbonblack to carburize the iron and reduce the oxides enables the production of a very fine dispersion due to its extremely fine particle size. Both of these factors contribute to its ability to improve densification during sintering as illustrated by experiments conducted which show 98% plus density compared to 94% plus for a minus 5 micron size natural product when sintered simultaneously.

The alloying oxides, however, are those which can be reduced under high vacuum conditions under sintering conditions which promote good densification without excessive time or temperatures. The reductant may be dry hydrogen, carbon or other suitable reducing agent. Such metals as nickel, molybdenum, tungsten, copper, etc. are particularly adaptable because of the volatility of their oxides which is similar to the iron. Such metals as chromium, silicon, etc. are more difficult to reduce and different sintering techniques are necessary to create complete reduction since the oxygen will be releasd at a higher temperature and/or vacuum. Dry hydrogen may be employed for reducing such metals. Since the oxide acts as a spacer to reduce sintering until reduction has taken place, a faster rate of heating is allowable and/or a higher temperature.

The very fine particle size of the graphite also helps to reduce the oxides by forming CO and $CO_2$ during the early part of sintering (around 1000° F.) by reacting with the easily reducible oxides such as iron, nickel, copper, etc.

The ability of the carbon to improve densification during sintering has been shown by experiments with high vacuum sintering using these techniques indicating that pure iron sinters to about 87% density from a green density of about 75% compared to 91% when carbon is added and both sintered simultaneously with carbon at 2050° F.

Another method of alloying is to deposite on the surface of the iron particles an alloy metal or metal compound whose undesirable ingredients are volatile under vacuum sintering conditions.

An important part of any such alloying additive is the temperature at which the undesirable gaseous element or elements volatilize under vacuum conditions, since the higher the temperature required, the greater is the possibility of sufficient sintering occurring to seal off some of the porosity and thus delay or prevent the release of the undesirable ingredients. It is best to keep this temperature below about 1200° F. and preferably below 1100° F. since significant sintering of high purity fine particle size iron powders occurs above this temperature. (As much as about 4% shrinkage has been recorded at 1250° F. in vacuum for high carbon, and 5.5% for pure iron with a green density of about 75%.)

For blending, it has been found satisfactory to employ normally standard techniques except that any additives be added separately and be blended into the iron powder for a period of time, such as thirty minutes each, prior to the extended period. Also, when more than one oxide or similar additive is used, it is best to make a complete blend (using the proper amount of graphite, iron and oxide) of each and then produce the final desired blend by intermixing the primary blends. This procedure reduces the tendency for the very fine ceramic powders to interlock, clump and group together and produce non-uniform dispersions.

The handling of powders must be done under very hygienic conditions. It has been found best to sift the mixed powders through a 325 mesh screen after blending and before use, in order to break up any small agglomerates created by the blending procedure. It has also been found desirable to do this to the raw powders, for the same reason.

The amount of carbon powder used in the blend must be sufficient to combine with all of the oxygen present in the form of oxides and thus form CO and/or $CO_2$ gases which are eliminated by the vacuum. Also, additional carbon is necessary to produce the desired amount of iron carbide.

The amount of oxide added to the mix is that amount necessary to obtain the desired alloy composition after the oxygen is removed.

The preferred compacting pressure to use is determined by several things. The higher the green density, the higher is the sintered density but the more difficult it is to remove the oxygen. Also, there needs to be sufficient green density to obtain sufficient strength during sintering to resist small ruptures caused by expanding gases. It has been determined that green densities of 70-75% produce satisfactory results, giving a final density around 95% with a 99.99% purity when using a good sintering pattern. Broadly speaking, the green densities may range from about 70-85%, approximately 75% being preferred.

The actual pressing can be accomplished by any normal practice but care must be taken to eliminate the possibility of substantial isolated air pockets being present in the powder of the filled cavity. Stirring or vibrating is helpful to prevent this. Such air pockets can create large pores in the compact, due to "bridging" during compaction and are very difficult or impossible to eliminate subsequently.

Sintering is carefully controlled to obtain the desired highest purity, high density, uniform small isolated pores and small grain size. The heating rate is important and is determined by the cross section of the compact, since the time required for the evolution of the gases depends on the distance the heat must travel inwardly and the gases outwardly. If the compact is heated too rapidly, the outside can sinter sufficiently to close surface porosity and thus considerably reduce the ability to eliminate gaseous elements from the interior of the compact.

Using the degree of vacuum as a guide during sintering, the best procedure for heating can be determined. When reduction of oxides begins, there is considerable degassing of the compact and this usually causes an increase in pressure within the vacuum vessel due to the inability of the pump to remove the gases fast enough. When this occurs, the temperature should be held until the majority of the degassing for that temperature has been completed. A slow enough heating rate can accomplish the same thing but with less efficiency, since the important thing is to degas off substantially all of the impurities before substantial pore-closing sintering can take place.

Some degassing can also take place at more elevated temperature but it becomes more difficult and, if there are sealed pores or otherwise trapped gaseous elements, either the gas must rupture the seal or diffuse through the matrix. Since rupturing can create large pores when the material is quite plastic at higher sintering temperatures, this is not desirable, especially if the material is to be used in the as-sintered condition where such ruptures could reduce the strength considerably. Hence, a slow heating rate is advisable to enable diffusion of gases such as hydrogen, nitrogen, etc. through the matrix while minimizing ruptures from forming.

For these reasons, it is especially desirable to have all degassing take place at as low a temperature as possible and that it should be accomplished before substantial pore-closing takes place. The temperature at which initial and substantial pore closing occurs depends on the ultimate particle size of the iron powder, its purity, and, to some extent, the activation which might occur when an alloying element is freshly reduced from the oxide in situ, e.g. nickel from freshly reduced oxide.

The choice of maximum sintering temperature and time is a compromise in that the higher they are, the greater is the density, the larger is the grain size and the higher is the cost. Also, the larger are the pores, since higher temperature and time make the small pores more mobile, whereby they move and collect to produce the larger pores which makes it difficult to obtain the desired high strength properties.

The time-temperature can be lowered as the purity increases (which allows easier diffusion), as the particle size reduces and as the degree of refinement prior to reaching the maximum time and temperature improves.

A satisfactory heating cycle for bars of steel described herein, approximately 1¼" square by 6" long is two hours to 1200° F., then three-and-one-half hours to 2200° F., holding at 2200° F. for two hours and then furnace cooling. The degree of vacuum is kept below 10 microns after major degassing takes place at less than 1200° F. This produces densities of more than 95% in 1% molybdenum—0.9% carbon, and in 2% nickel—0.8% carbon steels which are subjects of this method of production.

For the purposes of this invention, a steel is defined as a composition containing at least about 60 or 65% iron, carbon and the balance steel-alloying elements. An example of nickel-containing steel is one containing about 1% to 9% nickel, about 0.4 to 1.4% carbon and the balance essentially iron. A molybdenum-containing steel is one containing about 0.25% to 3% molybdenum, about 0.4% to 1.4% carbon and the balance essentially iron. The steels may include carbon-containing low, medium and high alloy steels. Examples of such steels include about 0.8% chromium, 0.2% molybdenum, about 0.30% carbon, and iron substantially the balance; about 5% chromium, 1.4% molybdenum, 1.4% tungsten, 0.45% vanadium, 0.35% carbon, and iron substantially the balance; about 8% molybdenum, 4% chromium, 2% vanadium, 0.85% carbon, and iron substantially the balance; about 18% tungsten, 4% chromium, 1% vanadium, 0.75% carbon, and iron substantially the balance; about 20% tungsten, 12% cobalt, 4% chromium, 2% vanadium, 0.80% carbon and iron substantially the balance.

As illustrative of the invention, the following examples are given.

EXAMPLE 1

Blending of the powders

An iron-nickel-carbon alloy steel was produced using a blend of carbonyl iron powder, high purity nickel oxide and carbon black, the amount of ingredients employed being sufficient to provide a batch of about 4,000 grams, the ingredients being proportioned to provide a final composition containing about 97% iron, 2% nickel and 1% carbon.

The carbonyl iron powder employed in the tests carried the designation type HP sold by the General Aniline and Film Corporation and had an average particle size of about 10 microns as determined by the Fisher sub-sieve sizer. The powder has an iron content of 99.6 to 99.9%, a carbon content of 0.01 to 0.04%, an oxygen content of 0.1 to 0.3% and up to 0.05% nitrogen.

Reagent quality nickel oxide was used containing 0.2% cobalt, 0.005% N, 0.005% Pb, 0.01% Fe, 0.005% $SO_4$ and 0.035% of alkali and alkaline earth sulfate. The average particle size of the nickel oxide was less than 0.5 micron.

The high purity carbon black employed was in the form of frangible one-thirty-second inch pellets referred to as "Witco pellets." The charge comprised 3864 grams of iron powder, 100 grams of nickel oxide and 56 grams of carbon, the amount of carbon added being sufficient to combine with residual oxygen in the iron and the combined oxygen in the nickel oxide, and also to provide 1% carbon for the steel composition. The excess carbon helps to provide the reducing environment for removing the oxygen in the compact. However, dry hydrogen may be employed to supplement the carbon.

The mixture was placed in a stainless steel ball mill one-third full with ¼", ½" and ¾" balls of 52100 steel. Sufficient acetone was added to the mill to bring the contents thereof to about three-quarters full. The ball mill was then run for four hours, following which the blended powder batch was removed and dried in vacuum. The dried powder was passed through a 325 mesh screen to break up the agglomerates.

Compacting the powder

The powder which has now been blended is pressed in a rectangular die to a green density of about 70 to 85% of true density, the compact having green dimensions of 7½" long, 1.375" wide and 1.4" high so as to provide sintered dimensions of about 7" long, 1" wide and 1" high. In producing a density of about 75% of true density, a pressure of about 25 t.s.i. (tons per square inch) was employed. With this density, intercommunicating pores were assured throughout the product.

Sintering of the compact

As has been stated hereinbefore, it is important in carrying out the sintering, that all gaseous impurities be removed before the compact is subjected to full sintering conditions. This is achieved by heating this composition to dull red heat (e.g. 600° C. or 1115° F.) in a furnace under vacuum, starting with a vacuum at room temperature of about 5 microns of mercury. As the compact reaches dull red heat, the pressure rises to about 300 microns in the furnace and gradually falls off to 5 microns, the heating time to reach temperature being about 2 hours. Thus, as the temperature reaches dull red heat, the excess carbon reacts with the residual oxygen in the iron to reduce it and also reduces the nickel oxide to metallic nickel. During the reducing cycle, the pressure rises as stated above.

After the compact has reached dull red heat, it is heated an additional 4½ hours, while the temperature is being raised to about 1200° C. or 2200° F. at a rate of about 150 to 160° C. or 270° F. to 290° F. per hour. The heating rate should be such that the temperature gradient between the outside surface of the compact and its center is maintained as small as possible. That is to say, the temperature in the center of the compact should be as close as possible to the outside surface. Upon reaching temperature, the compact is held at temperature for 2 hours and then furnace cooled to room temperature under a vacuum of about 5 microns. The density of the finally sintered product or billet was 96.1% of true density, the hardness about 75 to 8 Rockwell B, and the porosity about 3.9 volume percent. A similar sintered composition produced under the same conditions had a final density of about 97% of true density, a hardness of about 79–85 Rockwell B and a porosity of about 3 volume percent. In both instances, the pores were extremely fine and uniformly distributed throughout the sintered product. Generally speaking, the average pore size was less than 6 microns, over 75% being less than 4 microns (note FIG. 1).

A spectographic analysis of the composition before and after sintering indicated that high purity was obtained in the final product. In the unsintered condition, the composition, in addition to iron and nickel, contained by weight 1.25% C., 0.22% oxygen, 1.14% acid insolubles, 28 p.p.m. of sulfur, 24 p.p.m. of nitrogen, 212 p.p.m. of hydrogen and negligible amounts of molybdenum, copper and manganese.

On the other hand, the billet in the sintered condition contained, in addition to iron and nickel, 0.99% C, 23 p.p.m. oxygen, no acid insolubles, 20 p.p.m. sulfur, 26 p.p.m. nitrogen, 0.4 p.p.m. hydrogen, and negligible amounts of molybdenum, copper and manganese. Thus, in the as-sintered state, the total impurities came to less than 100 p.p.m. or less than 0.01% of the total composition, leaving a total iron-nickel-carbon content of at least about 99.99% by weight of the composition, that is to say, an ultra pure high carbon steel. The sintered billet was characterized by a high degree of cleanliness and micrographic homogeneity in both the transverse and longitudinal cross section.

Hot working the sintered product

The sintered billet was forged at 2200° F. to a bar five-eighths of an inch in diameter, the bar being thereafter machined to a diameter of three-eighths of an inch. The density of this forged nickel steel came to 7.87 or about 100% true density and exhibited a hardness of 102.2 Rockwell B.

Examination of the steel under the metallographic microscope showed it to be extremely clean, the steel exhibiting a JK rating of less than 1.

Physical properties

In the as-forged condition, the nickel steel exhibited a hardness of about 59 to 60 Rockwell C, the hardness increasing to 63 to 64 Rockwell C in the quench hardened condition. When the quenched steel was tempered to a hardness level of 55 to 56 Rc, it exhibited an ultimate tensile strength of about 269,000 p.s.i. (pounds per square inch) with practically no elongation. At a hardness level of 52 to 53 Rc, it exhibited an ultimate tensile strength of about 285,000 p.s.i. with a 6% elongation, while at a hardness level of 49 to 51 Rc the steel exhibited an ultimate tensile strength of about 279,500 p.s.i. at a still higher elongation of about 10%.

Microprobe analysis of the steel with an electron beam revealed the steel to have a very high order of homogeneity compared to certain of the vacuum melted steels. This comparison will be shown relative to other compositions hereinafter.

EXAMPLE 2

In producing a steel of iron-molybdenum-carbon composition containing about 1% molybdenum and about 1% carbon, a powder blend was prepared as in Example 1 containing 97.6% carbonyl iron powder (3904 grams), 1.5% $MoO_3$ (60 grams) and 1.4% carbon (56 grams).

Rectangular compacts were similarly produced, the compacts being pressed to densities ranging from about 70 to 85% of true density. At a pressure of 25 t.s.i., a compact was produced having a density of about 75% of true density. The sintering cycle employed was substantially the same as that used in Example 1.

Prior to sintering, the blended composition, in addition to the major ingredients iron and molybdenum, contained 1.23% carbon, negligible amounts of nickel, 28 p.p.m. of sulfur, 28 p.p.m. of nitrogen, 0.72% oxygen, 788 p.p.m. of hydrogen and 1.72% acid insolubles.

After sintering, the steel billet, in addition to iron and molybdenum, contained 0.99% carbon, negligible amounts of nickel, 20 p.p.m. sulfur, 20 p.p.m. nitrogen, 11 p.p.m. oxygen and 0.5 p.p.m. of hydrogen. Here, as in Example 1, the total impurities were substantially less than 100 p.p.m., thus indicating that the composition was made up of at least 99.99% total of the elements iron, molybdenum and carbon.

Two runs of the molybdenum steel were made. With the first run, a sintered density of 95.8% was obtained (4.2 volume percent voids), accompanied with a hardness of about 88 to 90 Rockwell B. With the second run, a density of 94% was obtained (6 volume percent voids) and a hardness of 84 to 86 Rockwell B. The pores in both instances were extremely fine and uniformly distributed, substantially 90% of the voids not exceeding about 4 microns in size (note FIG. 2).

In the forged condition, the alloy steel exhibited a density of 7.88, corresponding to 100% density for the forged composition. The as-forged hardness was about 105 Rockwell B. The steel metallographically was extremely clean and had a JK number of less than 1. The quenched hardness was in the neighborhood of about 60 Rockwell C. When the quench hardened steel was tempered at 400° F. for 24 hours, it exhibited a hardness of about 54 to 55 Rockwell C and an ultimate tensile strength of about 245,000 p.s.i. When the steel was tempered to a hardness of 44 to 46 Rockwell C, it exhibited an ultimate tensile strength of about 226,000 p.s.i. An electron microprobe analysis (to be described later) revealed the steel to be extremely uniform in composition.

EXAMPLE 3

In producing an iron-carbon steel containing 98.9% iron and 1.1% carbon, the procedure described in Example 1 was employed, the carbonyl iron powder being blended with Witco carbon in a ball mill. After thorough blending, the mixture is dried, sieved through a 325 mesh screen and then compressed in a die into a rectangular ber. At a pressure of 25 t.s.i., a green density of 71.5% was obtained. The bar was sintered as in Example 1 to produce an iron-carbon steel of the same order of high purity as in Examples 1 and 2.

As stated hereinbefore, while it is preferred to add alloying ingredients in the form of a reducible oxide, e.g., nickel oxide, substantially the same level of high purity can be obtained by adding the nickel as a finely divided nickel powder as described in the following example.

EXAMPLE 4

Carbonyl iron powder as in Example 1 was blended with carbonyl nickel powder of about 3 to 5 microns in size and pellets of Witco carbon, the amount of ingredients being sufficient to provide a nickel steel containing 1% nickel, about 0.9% carbon and the balance iron. About 1% carbon was blended to provided for an excess to scavenge any residual oxygen contained in the iron and nickel powders. The material which was blended in accordance with the procedure of Example 1 was compacted to a green density of about 72 to 74% and sintered in vacuum to form a billet using the sintering procedure of Example 1. The billet exhibited a sintered density of about 97.4% (2.6 volume percent voids) and a hardness of 79.7 Rockwell B. The steel oil quenched from 1550° F. exhibited a hardness of 60.5 Rockwell C. As in the other steels, the sintered compact was extremely clean and the pores were extremely fine.

An important advantage of the method provided by the invention is that the pores can be controlled to sizes which do not adversely affect the resulting allow composition. It is believed that ultra fine pores behave as a stress sink and inhibit propagation of cracks, since each pore is spherical and tends to prevent cracks from passing through it.

I have found that with my process, I can maintain the majority of the pores to sizes below 8 microns and, preferably, below 6 microns and thus greatly minimize metallographic heterogeneity insofar as pore size and distribution are concerned. In addition, by controlling the nature, size and distribution of the pores, I am able to provide a high purity sintered product capable of being densified to 100% density by hot forging or other hot working techniques while substantially avoiding the formation of internal cracks. Since, because of the method employed, the pores are evacuated, they are easily closed.

As illustrative of the pore size distribution obtained in a sintered nickel steel produced in accordance with the procedure described in Example 1 (about 3 to 4 volume percent of pores), reference is made to FIG. 1 wherein over 94% of the pores were 6 microns or less in size, about 75% of the pores being 4 microns or less in average size.

Likewise, with regard to FIG. 2 which depicts the pore size distribution of the sintered molybdenum steel of the type described in Example 2, over 96% of the pores had sizes of 6 microns or less, substantially 89% of the pores being 4 microns or less in size.

Generally speaking, so long as at least 75% of the pores are less than 8 microns in size, and substantially all are less than 10 microns in size (e.g., 90% or more) and so long as the microporosity is uniformly dispersed, a full density wrought metal product is assured when the aforementioned sintered product is hot or cold worked to the desired shape. As stated hereinbefore, in order to obtain a high degree of densification in the sintered product, the sintering cycle must be controlled so that porosity migration which tends to lead to large pore sizes, e.g., pores above 10 microns in size, is greatly minimized.

In addition, microsegregation of ingredients, for example, in the form of carbides, is also greatly inhibited. It is known that commercial 52100 alloy steel is subject to carbide segregation (chromium carbide) which has an adverse effect on the properties of the steel when used as a bearing material. For example, microsegregations of chromium carbide tend to cause protrusions in the raceways of gyro spin bearings after polishing. Since such protrusions have a tendency to spall, then such microsegregates can adversely affect the fatigue life of the bearing. Even when spalling does not occur, such protrusions, which are in effect surface discontinuities, can lead to crack formation under stress and thus eventual failure of the bearing by fatigue.

Recent strides in drip and/or vacuum melting, however, have greatly improved the homogeneity of commercial 52100 alloy steel. I have found, however, that with my invention, I am able to produce sintered products having a degree of purity and homogeneity far surpassing that obtained by vacuum melting for 52100 steel, even where such steels are double-vacuum melted. Such comparison is made in FIGS. 3 to 7 which are representative of X-ray intensity charts obtained by impinging an electron beam on the surface of a steel sample using an electron microprobe analyzer.

The probe concentrates a beam of high energy electrons in a small area of sample surface. The high energy electrons excite the emission of characteristic X-rays by the sample. The X-ray intensity is proportional to the composition of molybdenum in the sample.

Figure 3:
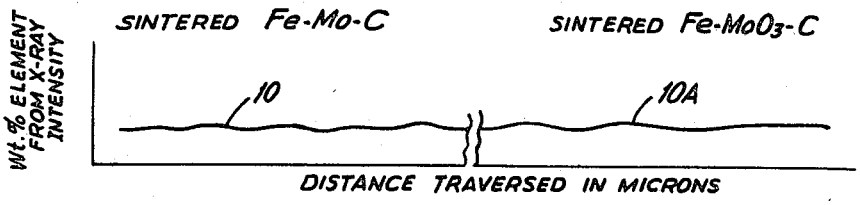

Referring to FIG. 3, the trace 10 is representative of a probe analysis which was conducted on a sintered molybdenum steel of the type set forth in Example 2 (except that the molybdenum was added to the powder blend in the metallic form) shows that the composition with respect to molybdenum is very uniform as evidenced by the smooth trace. Trace 10A of FIG. 3 shows a similar high degree of uniformity where the sintered steel was produced using $MoO_3$ as the starting alloy additive.

Figure 4:
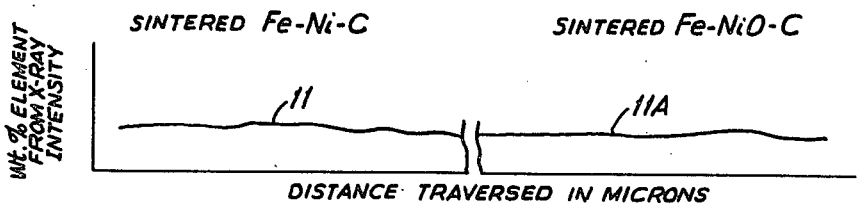

Likewise, referring to FIG. 4, traces 11 and 11A show that the nickel steel produced in accordance with the procedure of Example 1, regardless whether the starting alloying ingredient is nickel or nickel oxide powder, shows a high degree of uniformity as evidenced by the smooth traces.

Figure 5:
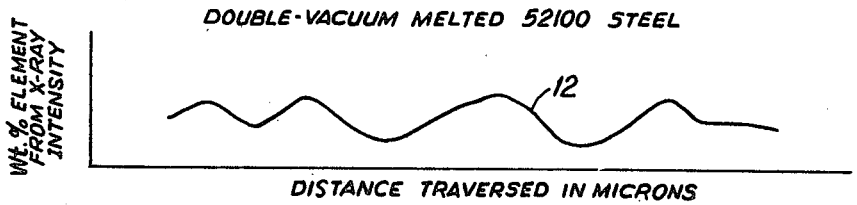

Referring to FIG. 5, an electron microprobe trace 12 is shown obtained on a sample of double-vacuum melted 52100 steel. As will be noted, the trace shows hills and valleys characteristic of concentrated areas of chromium in the form of chromium carbide. Such a trace is characteristic of structures produced by melting techniques as compared to sintered structures obtained by solid state diffusion processes.

Figure 6:
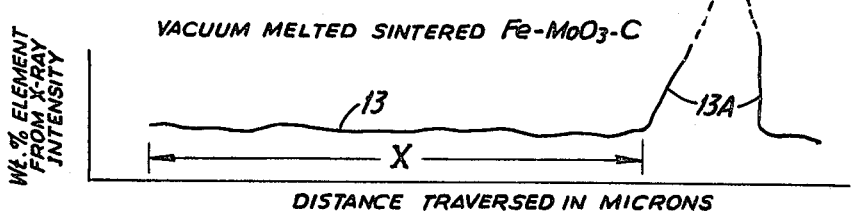
Figure 7:
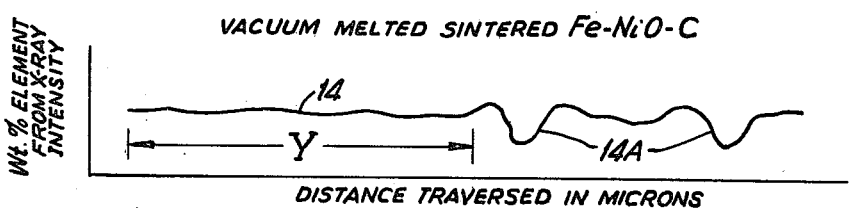

The foregoing is aptly illustrated by FIGS. 6 and 7 which are electron beam microprobe traces obtained on the same sintered material of FIGS. 3 and 4 (traces 10A and 11A) after the sintered product was vacuum melted and cooled to room temperature. In FIG. 6 (vacuum melted Fe-Mo-C alloy steel using $MoO_3$ as the starting alloy additive), the trace 13 is shown quite smooth over a portion "X" of the sample traversed by the beam, until the beam intercepted a carbide segregate or precipitate of the type $Mo_2C$ resulting in an unusually high X-ray intensity 13A due to a high concentration of molybdenum combined as the carbide resulting from coalescence and segregation. Note, however, that the other portion of the trace 13 is smooth and uniform, indicating that my invention has utility in the production of a high purity electrode alloy for use in vacuum melting processes, provided that the vacuum melted alloy is chilled cast to avoid the formation of carbide and similar segregates of the type indicated by the marked fluctuation of trace 13A of FIG. 6.

In FIG. 7, the trace shown there is of a vacuum melted sintered nickel alloy steel (Fe-Ni-C) wherein the starting nickel was in the form of NiO. The sintered nickel alloy as produced in accordance with Example 1 was vacuum melted and cooled to room temperature. It will be noted that trace 14 is quite smooth over the portion "Y" of the sample traversed by the beam, until the beam intercepted a carbide segregate of the type $M_3C$ which probably corresponds to the system (Fe, Ni)$_3$C. As will be noted from trace portion 14A, a relatively high concentration of carbide is indicated due to coalescence and segregation during freezing.

The carbide segregates referred to in the discussion of FIGS. 6 and 7 showed in the case of FIG. 6 a molybdenum carbide type segregate obtained with the molybdenum steel after vacuum melting, and in the case of steel discussed with respect to FIG. 7, a $M_3C$ type carbide, possibly of the system $(Fe, Ni)_3C$. However, such segregates can be minimized by chill casting or quick freezing the vacuum melted sintered material. By the term "vacuum melted sintered material" in meant vacuum melting a highly pure alloy which has first been produced by sintering in accordance with my invention.

Referring to FIGS. 6 and 7, it will be noted that traces 13 and 14 are much smoother than trace 12 of FIG. 5 (double vacuum melted 52100 steel). This supports the position that the method of the invention enables the production of purer and more homogeneous metals and alloys than the vacuum melting techniques now available.

An advantage of using an electron microprobe analyzer is that a quantity can be derived for expressing quantitatively the homogeneity of an alloy. As stated hereinabove, the probe concentrates a beam of high energy electrons on a small area of sample surface. The high energy electrons excite the emission of characteristic X-rays by the sample. However, during the probe, the X-rays in turn may be counted by a proportional counter and compared with results from a known material. With the introduction of a counter, counting statistics must be used to achieve any degree of accuracy. The normal counting error expected when a count is made is approximately equal to the square root of that count.

$$\sigma_{exp} = \sqrt{N}$$

where:

$\sigma_{exp}$ = error expected
$N$ = total number of counts in a time interval

The standard deviation is the true error and is calculated in the following manner.

$$\sigma_{obs} = \sqrt{\frac{\epsilon(N-\bar{N})^2}{n-1}}$$

where:

$\sigma_{obs}$ = standard deviation or error observed
$N$ = total number of counts in a time interval
$\bar{N}$ = mean average of many such counts
$n$ = number of individual counts made In X-ray emission spectrography, where the instrument does not have the quality of a probe, it is expected for a homogeneous sample that $$\frac{\sigma_{obs}}{\sigma_{exp}} = 1$$

This is saying that the expected error is equal to or greater than the actual error. Evidence of non-uniformity is indicated when $\sigma_{obs}$ is greater than $\sigma_{exp}$. Indications are that when $\sigma_{obs}/\sigma_{exp}$, otherwise known as the homogeneity factor, is greater than 2, the material is inhomogeneous in that element. Using the electron microprobe, the following results were obtained.

| Sample | $\sigma_{exp}$ | $\sigma_{obs}$ | $\sigma_{obs}/\sigma_{exp}$ |
| --- | --- | --- | --- |
| (A) Fe-NiO-C [1] | 29.25 | 14.89 | 0.509 |
| (B) Fe-Mo-C [2] | 6.26 | 5.11 | 0.816 |
| (C) Fe-MoO₃-C [3] | 13.43 | 5.16 | 0.384 |
| (D) 52100 Steel [4] | 27.13 | 113.18 | 4.172 |

*Based on 20 random readings.
[1] Sintered Fe-Ni-C steel using NiO powder as starting material.
[2] Sintered Fe-Mo-C steel using Mo powder as starting material.
[3] Sintered Fe-Mo-C steel using MoO₃ powder as starting material.
[4] Double-vacuum melted 52100 steel.

In using the electron microprobe as a check on homogeneity, the probe in the counting range usually yields values of less than unity. Such values are indications of a high degree of homogeneity. As a rule, values of less than two and generally less than 1.5 are indications of homogeneity insofar as this invention is concerned.

Referring to the foregoing table, it will be noted that as to samples A, B and C produced in accordance with the invention, the ratio of $\sigma_{obs}$ to $\sigma_{exp}$ is less than one, thus confirming the homogeneity indicated by FIGS. 3 and 4. However, with regard to sample (D) of double-vacuum melted 52100 steel, which is considered by the trade to be excellent in purity and homogeneity, the ratio of $\sigma_{obs}$ to $\sigma_{exp}$ is 4.172 which is substantially above the cut-off maximum of 2 as stated hereinabove. As is quite evident, this invention makes it possible to produce high purity steels and alloys generally having an extremely high degree of microscopic homogeneity.

While the carbon employed in producing the steel of the invention is in the form of one-thirty-second inch pellets, actually the pellets are agglomerates of very finely divided carbon particles, the average size of the particles being of the order of about 78 millimicrons or 0.078 micron. The pellets are easier to handle with minimum dust loss while being adapted to disintegrate during the blending step.

Where iron or an iron-base powder is the matrix metal, generally speaking the amount of iron will constitute at least about 65% of the steel composition, although preferably at least 75% iron is generally desirable in producing high alloy steels. The matrix metal powder should have a purity of at least 99% as to its total alloy content, the remainder being in the form of volatilizable constituents. Examples of the matrix metals are pure iron powder, iron-nickel alloy powder, iron molybdenum alloy powder and other iron-base steel-forming powder.

The particle size of the matrix metal may range up to 40 microns in size and, preferably, not exceed 10 microns for optimum homogeneity of the final sintered product.

On the other hand, the alloy-forming ingredients, including carbons, should be as fine as possible, as the finer the particle size, the more rapid is the alloy diffusion process during sintering. Thus, while the alloy-forming ingredients may range up to 5 or 10 microns, I prefer they do not exceed 2 microns, and, more preferably, be less than 1. Fine particles of pure metal of less than 2 microns must be handled carefully as they tend to be exothermic in the presence of oxygen-containing atmosphere. Thus, I prefer to use alloy-forming ingredients in the form of finely divided metal oxides, particularly since such metal oxides below one micron in size, e.g. below 0.5 micron, provide good mixing bulk, have low agglomerating tendency and can be easily reduced in situ as part of the porous compact. The metal and the combined oxygen should at least be 99% pure, the remainder being volatilizable ingredients. Examples of alloy-forming additives in the forms of metal oxides are nickel oxide, molybdenum oxide and other reducible metal oxide powder suitable for steel making.

As stated hereinbefore, one of the main advantages of the invention is that high purity sintered products can be made which are superior in metallurgical quality to products produced by conventional and even the best controlled vacuum melting techniques. The sintered product, despite the fact that it may contain up to 10 volume percent of porosity, is capable of being hot worked to full density so long as the porosity is uniformly dispersed and substantially all the pores are less than 10 microns in average size of which at least 75% are less than 8 microns in average size.

The sintered product is particularly characterized by high cleanliness as evidenced by the inclusion count determined as a JK number. The JK number is classified in the SAE Handbook (SAE J422a) on a scale of 1 to 8 based on inclusion counts at 100 times magnification.

The JK rating is a standard and common method for defining cleanliness of the steel, particularly in the rolling contact bearing field. In the Iron and Steel Institute Special Report 77 (London, England) published in 1963 by Percy Lund, Humphries and Co. Ltd. (London) it is stated on page 7 that there are four categories of inclusion types (e.g. sulphides, alumina, silicates and oxides) to which the rating is directed. As to all of these types, the steel of the invention has a JK rating of less than 1, whereas the prevailing steels, to wit, air melted 52100 generally has a JK rating of 2½ maximum, vacuum melted, 52100 steel having a JK rating of 1½ maximum.

The sintered product of my invention has particular utility as an electrode material in vacuum melting. Since the electrode is highly pure, the vacuum melted product is chill cast to reduce segregation of carbides and the like where alloy steels are involved.

What is claimed is:

1. A high purity sintered workable steel, the essential ingredients making up the steel composition together with about 0.1 to 2.5% carbon constitute at least about 99.5% of the total composition, the iron content being at least about 65% of the composition, said sintered steel being characterized by a relatively high density and having a uniform distribution of substantially non-intercommunicating pores therethrough, the average size of the pores being substantially all less than 10 microns in size, at least 75% of the pores being less than 8 microns in size, said sintered product being further characterized by a homogeneity factor of leses than about 2 as determined by an electron microprobe analyzer using the formula:

$$\sigma_{obs} = \sqrt{\frac{\epsilon(N-\overline{N})^2}{n-1}}$$

where:

$\sigma_{obs}$ = standard deviation or error observed
$N$ = total number of counts in a time interval
$\overline{N}$ = mean average of many such counts
$n$ = number of individual counts made.

2. The sintered steel product of claim 1 characterized further by an inclusion cleanliness factor as represented by a JK number of less than about 1.

3. The sintered steel of claim 1 in the form of a billet characterized by homogeneity in both the transverse and longitudinal cross section.

4. The sintered steel of claim 1 containing at least 85% iron, said iron and the ingredients making up the steel, accounting for at least about 33.5% of the total steel composition, the density of the steel being at least 90% of true density.

5. The sintered steel of claim 4 comprising about 1% to 9% nickel, about 0.4 to 1.4% carbon and the balance essentially iron.

6. The sintered steel of claim 4 comprising about 0.25% to 3% of molybdenum, 0.4% to 1.4% carbon and the balance essentially iron.

7. A sintered wrought steel product, the essential ingredients of which making up the steel composition together with about 0.1 to 2.5% carbon constitute at least about 99.5% of the total composition, the iron content being at least about 65%, said sintered steel being characterized by a density of substantially 100% of true density, and a homogeneity factor of less than about 2 as determined by a microprobe analyzer using the formula:

$$\sigma_{obs} = \sqrt{\frac{\epsilon(N-\overline{N})^2}{n-1}}$$

where:

$\sigma_{obs}$ = standard deviation or error observed
$N$ = total number of counts in a time interval
$\overline{N}$ = mean average of many such counts
$n$ = number of individual counts made.

8. The sintered steel product of claim 7 characterized further by an inclusion cleanliness factor as represented by a JK number of less than about 1.

9. The wrought steel of claim 7 containing at least 85% iron, said iron and the ingredients making up the heat treatable steel accounting for at least about 99.5% of the total steel composition.

10. The wrought steel product of claim 9 comprising about 1% to 9% nickel, about 0.4 to 1.4% carbon and the balance essentially iron.

11. The wrought steel product of claim 9 comprising about 0.25% to 3% molybdenum, 0.4% to 1.4% carbon and the balance essentially iron.

References Cited

UNITED STATES PATENTS

| | | | |
|---|---|---|---|
| 3,357,826 | 12/1967 | Honaker | 75—226 X |
| 3,357,818 | 12/1967 | Findeisen | 75—206 X |
| 3,341,325 | 9/1967 | Cloran | 75—225 |

FOREIGN PATENTS

| | | |
|---|---|---|
| 618,293 | 2/1949 | Great Britain. |
| 752,687 | 7/1956 | Great Britain. |
| 587,311 | 6/1959 | Canada. |

CARL D. QUARFORTH, Primary Examiner

A. J. STEINER, Assistant Examiner

U.S. Cl. X.R.

75—123, 211